(12) United States Patent
Yamamoto et al.

(10) Patent No.: US 10,518,309 B2
(45) Date of Patent: Dec. 31, 2019

(54) DIE-SLIDE DEVICE OF EXTRUSION PRESS

(71) Applicant: Ube Machinery Corporation, Ltd., Ube-shi (JP)

(72) Inventors: Takeharu Yamamoto, Ube (JP); Sho Nonoue, Ube (JP)

(73) Assignee: Ube Machinery Corporation, Ltd., Ube (JP)

( * ) Notice: Subject to any disclaimer, the term of this patent is extended or adjusted under 35 U.S.C. 154(b) by 370 days.

(21) Appl. No.: 15/555,257

(22) PCT Filed: Jun. 30, 2015

(86) PCT No.: PCT/JP2015/068792
§ 371 (c)(1),
(2) Date: Sep. 1, 2017

(87) PCT Pub. No.: WO2016/143154
PCT Pub. Date: Sep. 15, 2016

(65) Prior Publication Data
US 2018/0015517 A1 Jan. 18, 2018

(30) Foreign Application Priority Data
Mar. 9, 2015 (JP) .................................. 2015-045593

(51) Int. Cl.
*B21C 35/04* (2006.01)
*B21C 23/21* (2006.01)
*B23D 15/04* (2006.01)

(52) U.S. Cl.
CPC .......... *B21C 23/212* (2013.01); *B21C 23/214* (2013.01); *B23D 15/04* (2013.01)

(58) Field of Classification Search
CPC ... B21C 23/212; B21C 23/214; B21C 23/211; B21C 23/002; B21C 23/21; B21C 23/08; B21C 35/04; B23D 15/04
(Continued)

(56) References Cited

U.S. PATENT DOCUMENTS

2008/0202115 A1* 8/2008 Geiger ...................... B60T 1/10
60/534
2010/0000283 A1* 1/2010 Yamamoto .............. B21C 23/08
72/272
(Continued)

FOREIGN PATENT DOCUMENTS

| JP | 06-328123 A | 11/1994 |
|---|---|---|
| JP | 2013-244509 A | 12/2013 |
| WO | 2011/074106 A1 | 6/2011 |

*Primary Examiner* — David B Jones
(74) *Attorney, Agent, or Firm* — DLA Piper LLP (US)

(57) ABSTRACT

An extrusion press die-slide device is equipped with: a fixed frame; a moveable frame that can move linearly but which is supported by the fixed frame in a non-rotatable manner; a first motion conversion mechanism that converts input rotational motion to linear motion and outputs the same to cause the moveable frame to move linearly with respect to the fixed frame; and a second motion conversion mechanism attached to the moveable frame and equipped with a pusher to impart a pressing force to a die of the extrusion press, and which transmits the input rotational motion to the first motion conversion mechanism and converts the input rotational motion to linear motion and outputs the same to cause the pusher to move linearly with respect to the moveable frame.

9 Claims, 7 Drawing Sheets

(58) Field of Classification Search
USPC .......................................................... 72/263
See application file for complete search history.

(56) References Cited

U.S. PATENT DOCUMENTS

| | | | |
|---|---|---|---|
| 2017/0225211 A1* | 8/2017 | Yamamoto | B21C 35/04 |
| 2017/0297068 A1* | 10/2017 | Yamamoto | B21C 23/211 |
| 2018/0001365 A1* | 1/2018 | Yamamoto | B23D 15/04 |
| 2018/0015517 A1* | 1/2018 | Yamamoto | B21C 23/214 |

* cited by examiner

EXTRUSION DIRECTION

ROTATION DIRECTION OF GEAR AT TIME OF ADVANCE

DIE-SLIDE DEVICE OF EXTRUSION PRESS

TECHNICAL FIELD

The present invention relates to a die-slide device of an extrusion press for extruding a billet of a ferrous metal or nonferrous metal from a die to form a shaped member.

BACKGROUND ART

In general, when extruding a billet made of a metal material such as aluminum or an alloy material thereof by an extrusion press machine, an extrusion stem is attached to a front end part of a main ram driven by a hydraulic cylinder. A container is pressed against a die. In that state, the billet is stored in the container by the extrusion stem or the like. Further, the main ram is made to further advance by being driven by the hydraulic cylinder whereby the billet is pressed by the extrusion stem. Therefore, a shaped product is pushed out from an outlet part of the die.

Even in the past, there are many types of extruded products and the frequency of changing dies had increased. In recent years, however, the production of extremely small lots of diverse products has been increasing. Along with this, the frequency of changing dies has also dramatically increased. As opposed to this, in the conventional die changing device, although the die changing time has been shortened, there has been a demand for further reduction of time. Further, the conventional die changing device uses a hydraulic cylinder, so the hydraulic cylinder is long and a large space is required. Furthermore, according to PLT 1, a die is changed by driving a chain installed on the container side of the end platen to thereby make the die move from an extrusion position to a changing position outside the extrusion press and changing the dies, then again move the die to the extrusion position. The chain is installed in the vicinity of the heated die and container, so the chain became high in temperature and maintenance of the chain took more time compared with a usual one used cold.

CITED REFERENCE LIST

Patent Literature

PLT 1: Japanese Patent Publication No. 2013-244509A

SUMMARY OF INVENTION

Technical Problem

A conventional die changing device uses a hydraulic cylinder, so the hydraulic cylinder is long and a large space is required. Further, there is also a risk of fire due to leakage of oil after long years of use.

In a conventional type, a die may be changed by driving a chain installed on the container side of the end platen to thereby make the die move from an extrusion position to a changing position outside the extrusion press and changing the dies, then again move the die to the extrusion position. The chain is installed in the vicinity of the heated die and container, so the chain became high in temperature and maintenance of the chain took more time compared with a usual one used cold.

Solution to Problem

In order to solve the aforementioned problems, according to a first aspect of the present invention, there is provided a die-slide device of an extrusion press, comprising a fixed frame, a moving frame supported by the fixed frame to be able to linearly move with respect to the fixed frame but to be unable to rotate, a first motion converting mechanism for converting input rotational motion to linear motion and outputting the same so as to move the moving frame linearly with respect to the fixed frame, and a second motion converting mechanism having a pusher for pushing against a die of the extrusion press and attached to the moving frame, the second motion converting mechanism transmitting input rotational motion to the first motion converting mechanism and moving the pusher linearly with respect to the moving frame by converting the input rotational motion to linear motion and outputting the same.

In the present invention, the first motion converting mechanism may be provided with a first ball screw fixed to the fixed frame and extending in a direction of movement of the moving frame, a first nut screwed to the first ball screw and rotatably supported by the moving frame, and a first gear fixed to the first nut, the second motion converting mechanism may be provided with a second ball screw rotatably supported by the moving frame, a second nut screwed to the second ball screw and fixed to the pusher, and a second gear fixed to the second ball screw and meshing with the first gear of the first motion converting mechanism, and the pusher may be supported by the moving frame to be able to linearly move with respect to the moving frame, but to be unable to rotate.

In the present invention, the die-slide device may further comprise a motor supplying rotational drive power to the second motion converting mechanism and the motor may be fixed to the moving frame and move together with the moving frame.

In the present invention, the moving frame may be supported by the fixed frame via a linear guide device.

According to a second aspect of the present invention, there is provided an extrusion press comprising the die-slide device and a cutting device for cutting an extruded product extending through a die and an end platen of the extrusion press when changing a die of the extrusion press, in which extrusion press, the cutting device is attached to the end platen of the extrusion press, and the cutting device comprises a pusher of cutting device which moves in the same direction as the direction of movement of the pusher of the die-slide device to push against the die.

In the present invention, the cutting device may comprise a hydraulic cylinder for driving the pusher of cutting device.

In the present invention, the cutting device may comprise a ball screw, a nut screwed to the ball screw, and a motor for supplying rotational power to the ball screw to drive the pusher of cutting device.

In the present invention, the cutting device may have a stroke of cutting the extruded product of about 0.8 time a diameter of the die.

In the present invention, a non-combustible hydraulic fluid may be used as hydraulic fluid of the hydraulic cylinder of the cutting device.

Advantageous Effects of the Invention

In the present invention, since the second motion converting mechanism is attached to the moving frame that is linearly moved by the first motion converting mechanism, the stroke of the pusher is obtained as the stroke of the total of the amounts of movement generated by the first motion converting mechanism and the second motion converting mechanism. As a result, the overall length of the die-slide device can be shortened as compared with the conventional one, therefore the installation area can be minimized and space saving of the equipment can be realized.

DESCRIPTION OF EMBODIMENTS

Embodiments of a die-slide device of an extrusion press according to the present invention will be described in detail below with reference to the drawings.

Figure 1:
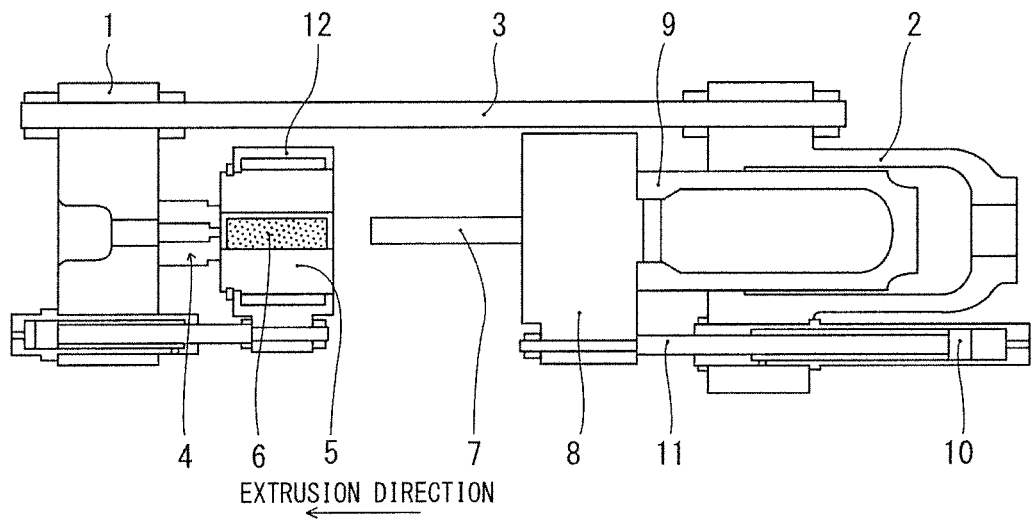
FIG. 1 is a longitudinal cross-sectional view of a principal part of an extrusion press according to a first embodiment of the present invention.

First, an outline of an extrusion press according to a first embodiment of the present invention will be described with reference to FIG. 1. The extrusion press shown in FIG. 1 is of the single acting short stroke type, in which an end platen 1 and a main cylinder 2 are arranged to face each other and the two are connected by a plurality of tie rods 3. A die 4 formed with an extrusion hole is disposed between the inner surface of the end platen 1 and a container 5. A billet 6 is loaded in the container 5. This is pushed and pressed toward the die 4, whereby an extruded material of a cross-section corresponding to the die hole is extruded.

The main cylinder 2 that generates an extrusion acting force has a main ram 9 built therein and is capable of pressing and moving it toward the container 5. At the front end part of the main ram 9, an extrusion stem 7 is attached through a main cross head 8 in a state projecting toward the container 5 to be arranged coaxially with a billet loading hole of the container 5 by making it closely contact a not shown dummy block at its tip. When the main cylinder 2 is driven to advance the main cross head 8, the extrusion stem 7 is inserted into the billet loading hole of the container 5 and presses the rear end face of the loaded billet 6 to push out the extruded material.

Note that a plurality of side cylinders 10 are attached to the main cylinder 2 in parallel with the axial center of extrusion. Cylinder rods 11 of the side cylinders are connected to the main cross head 8. Due to this, the extrusion stem 7 can be initially moved to a position close to the container 5 as a preparation step of the extrusion process.

The extrusion pressurizing operation is performed using both the main cylinder 2 and the side cylinders 10.

Figure 2:
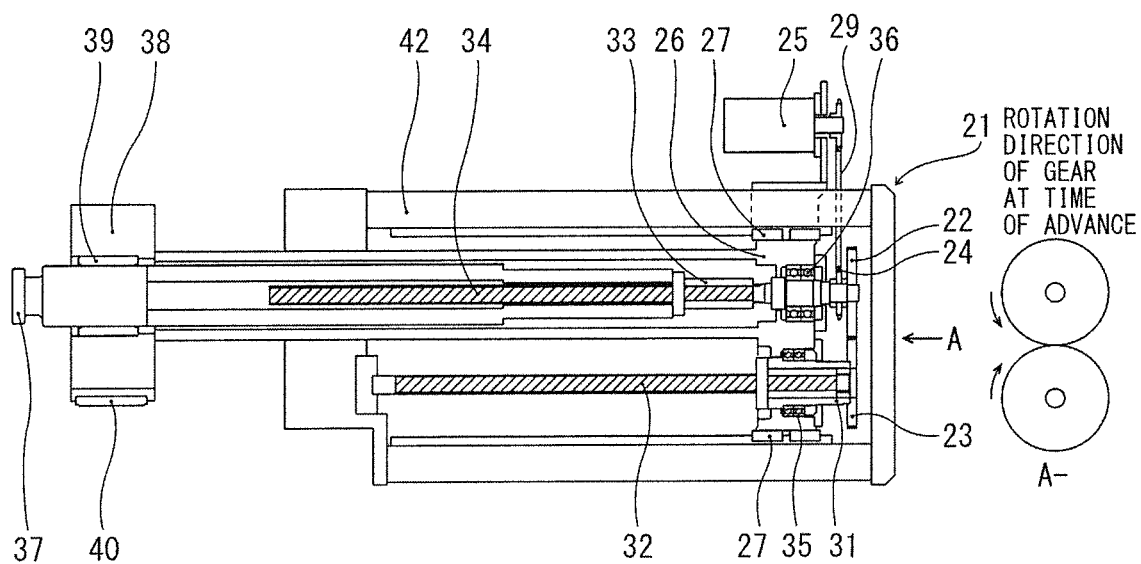
FIG. 2 is a longitudinal cross-sectional view of a die-slide device of an extrusion press according to a first embodiment of the present invention.

FIG. 2 is a longitudinal cross-sectional view of a die-slide device 21 of the extrusion press according to the first embodiment of the present invention. The die-slide device 21 includes a fixed frame 42, a moving frame 26, a linear guide device 27, a first motion converting mechanism, a second motion converting mechanism, and a motor 25 fixed to the moving frame 26. The first motion converting mechanism includes a first gear 23, a first nut 31, a first ball screw 32, and a first bearing 35. The second motion converting mechanism includes a second gear 22, a second nut 33, a second ball screw 34, a second bearing 36, a pusher 37, and a pulley 24. The first ball screw 32 and the second ball screw 34 are arranged in parallel.

When the motor 25 rotates the pulley 24 through a timing belt 29 or a chain, the second gear 22 and the first gear 23 meshing therewith rotate. The first gear 23 and the second gear 22 rotate in opposite directions. In the figure, a case where the first gear 23 rotates clockwise and the second gear 22 rotates counterclockwise when viewed from the arrow A will be explained.

In the first motion converting mechanism, the first nut 31 and the first gear 23 are fastened together. The first ball screw 32 is fixed to the fixed frame 42. The first nut 31 is screwed with the first ball screw 32 and is rotatably supported by the moving frame 26 via the first bearing 35. Therefore, the first nut 31 is constrained in linear movement with respect to the moving frame 26, but can freely rotate. Therefore, when the first gear 23 is rotated and the first nut 31 rotates, the first nut 31 moves on the first ball screw 32 in the left direction in the drawing. Accordingly, the moving frame 26 also moves to the same direction as the first nut 31. Further, the moving frame 26 is supported by the fixed frame 42 via the linear guide device 27 so as to be able to move linearly with respect to the fixed frame 42, but not to be able to rotate. The motor 25 is fixed to the moving frame 26, so the motor 25 also moves simultaneously in the left direction in the drawing.

A front end part 38 on the left side of the moving frame 26 in the drawing has a rectangular parallelepiped block. Further, an inner sliding member 39 and outer sliding member 40 are attached thereto. The inner sliding member 39 is disposed between the front end part 38 of the moving frame 26 and the pusher 37 inserted through the center portion thereof. The outer sliding member 40 is disposed between the lower surface of the front end part 38 of the moving frame 26 and a guide 18 provided on the container side surface of the end platen 1 of the extrusion press. As a result, the front end part 38 of the moving frame 26 extending from the fixed frame 42 in the left direction in the drawing is guided by the guide 18 and therefore is supported to be able to linearly move with respect to the guide 18, but to be unable to rotate.

On the other hand, in the second motion converting mechanism, the second ball screw 34 fixed to the second gear 22 is supported by the moving frame 26 to be able to rotate through the second bearing 36. In the present embodiment, the second ball screw 34 rotates in the opposite direction to the first gear 23. The second nut 33 screwed to the second ball screw 34 is fixed to a cylindrical pusher 37 extending long in the left direction in the drawing. The cylindrical front end part of the pusher 37 is supported by the front end part 38 of the moving frame 26 so as to be able to linearly move with respect to the moving frame 26 via the inner sliding member 39 but not to be able to rotate. Therefore, the second nut 33 fixed to the pusher 37 is also able to linearly move with respect to the moving frame 26, but not to be able to rotate. Therefore, when the second ball screw 34 rotates in the reverse direction to the first gear 23, the second nut 33 moves to the left in the drawing.

Since the die-slide device 21 is configured as described above, the stroke of the pusher 37 is equal to the total of the amount of linear movement of the moving frame 26 with respect to the fixed frame 42 based on the operation of the first motion converting mechanism and the amount of linear movement of the pusher 37 with respect to the moving frame 26 based on the operation of the second motion converting mechanism.

In the drawing, when the ball screw is a right-handed screw, the first nut 31 rotates to the right in the first motion converting mechanism, so the first nut 31 moves in the left direction. In the second motion converting mechanism, the second ball screw 34 rotates counterclockwise, so the second nut 33 moves to the left side in the drawing.

Figure 8:
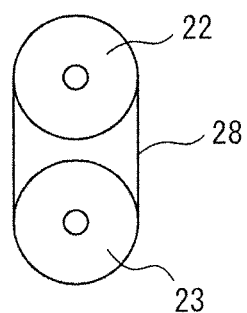
FIG. 8 is a schematic view showing two sprockets of a die-slide device of an extrusion press according to a modification of the first embodiment of the present invention.

Next, a die-slide device according to a modification of the first embodiment in which a first sprocket 23 and a second sprocket 22 are used instead of the first gear 23 and the second gear 22 in the die-slide device of the first embodiment will be described with reference to FIG. 8. In this example, since the first sprocket 23 and the second sprocket 22 are connected by one common chain 28. Both rotate to the right. In the first motion converting mechanism, since the first ball screw 32 is a ring-handed screw and the first sprocket 23 rotates to the right, the first nut 31 moves in the left direction in the drawing. In the second motion converting mechanism, since the second ball screw 34 rotates to the right, in order to move the second nut 33 to the left toward the paper, the second ball screw 34 and the second nut 33 are left-handed screws. That is, the right- and left-handed screws of the first motion converting mechanism and the second motion converting mechanism have an important relationship with the rotating directions of the first sprocket 23 and the second sprocket 22.

Figure 3:
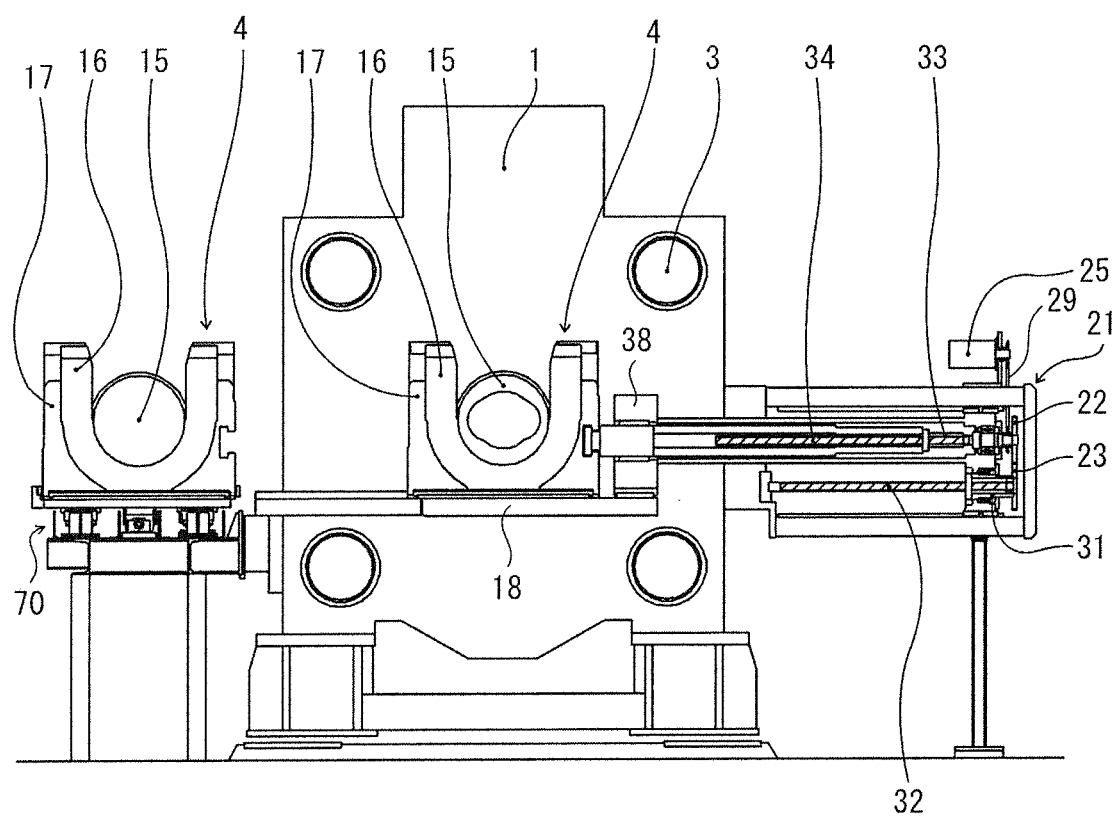
FIG. 3 is a view of a state in which the die-slide device shown in FIG. 2 is coupled with a die as seen from a container side.

FIG. 3 is a view of the location where the die-slide device 21 is attached to the main body of the extrusion press as seen from the container side. The die-slide device 21 is horizontally attached to the side opposite to the operating side of the extrusion press. The front end part 38 of the moving frame of the die-slide device 21 is slidably supported by the guide 18 fixed to the end platen 1 via the outer sliding member 40. The die-slide device 21 is installed outside of the extrusion press, so maintenance is easier compared with the conventional case. Furthermore, the die-slide device 21 is extremely compact because it employs approximately twice the stroke of a conventional die-slide device.

Figure 4:
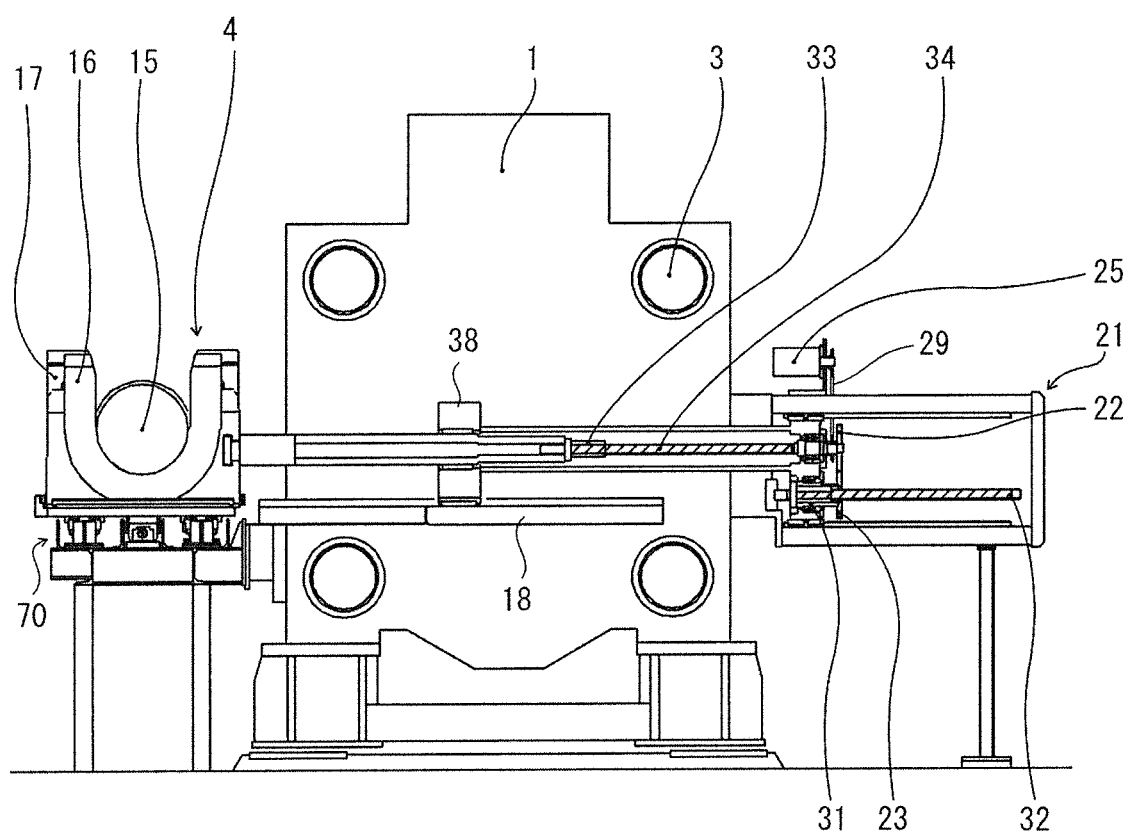
FIG. 4 is a view of the state, seen from the container side, of the time when the die-slide device shown in FIG. 2 moves the die out of the extrusion press or the time of the longest stroke of the device.

FIG. 4 shows a state in which the first motion converting mechanism and the second motion converting mechanism of the die-slide device 21 are actuated by being driven by the motor 25. In this state, the die 4 is pushed by the pusher 37 to a location of a die changing device 70 outside of the extrusion press. By using the die-slide device 21 driven by a servo motor according to the first embodiment of the present invention, it is possible not only to speed up the operation for changing the die 4 but also to reduce the speed so as to reduce the shock before stopping—which is not easy in the case of the conventional hydraulic system. As a result, it also becomes possible to increase the maximum speed of movement of the die 4 to thereby increase the average speed. Therefore, the traveling time of the die 4 is shortened which leads to an improvement in productivity.

Figure 5:
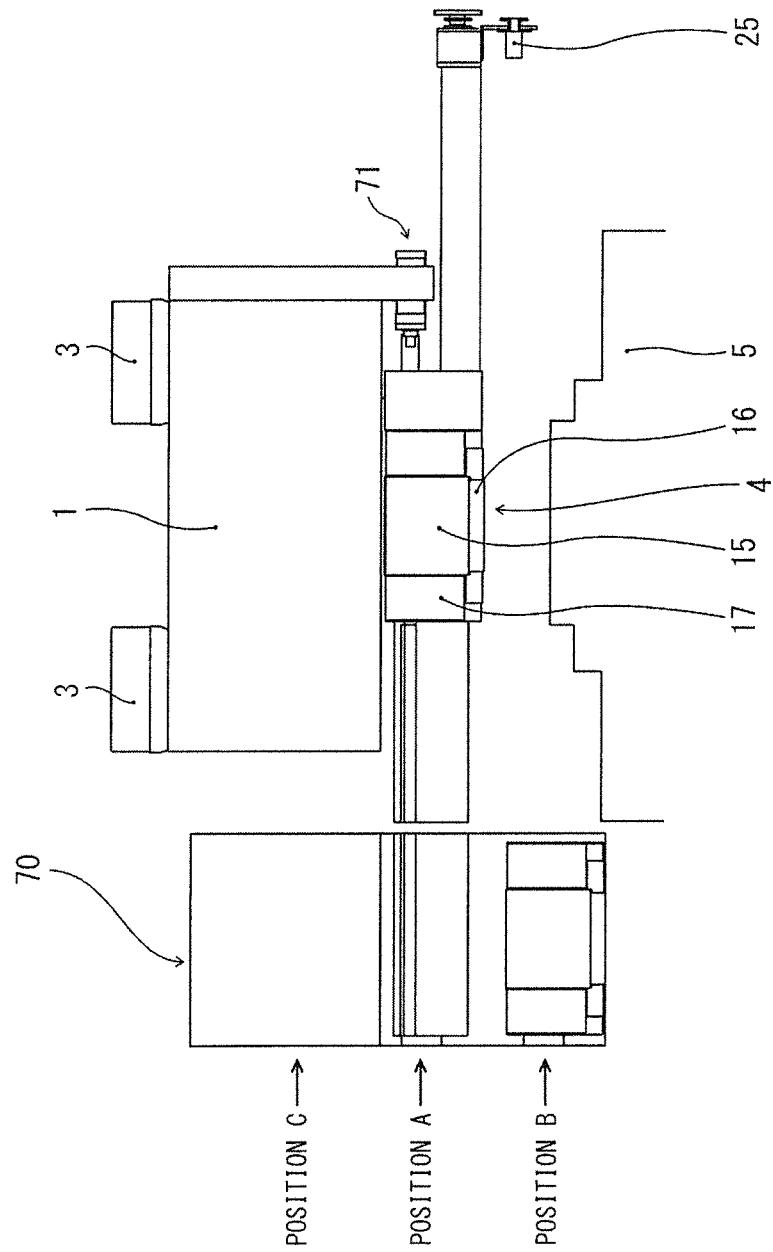
FIG. 5 is a plan view of the die-slide device of an extrusion press according to the first embodiment of the present invention.

FIG. 5 is a plan view showing the relationship between the die-slide device 21 of the extrusion press according to the first embodiment and the die changing device 70. Note that, in FIG. 5, a cutting device 71 for cutting the extruded product is also shown. As shown in FIG. 5, the die 4 located at the center of the extrusion press is moved to the operation side from the center of the extrusion press by the die-slide device and set on the die changing device 70. In the die changing device 70, the die 4 is moved by the linear guide. The new die 4 stands by at the position B or C and the die to be changed is moved to the position A. After that, the die 4 to be changed is retracted to the position C when the new die 4 is standing by at the position B and to the position B when the new die 4 is standing by at the position C. Then, the new die 4 moves to the vacant position A, and the new die 4 and the die-slide device are connected.

Figure 6:
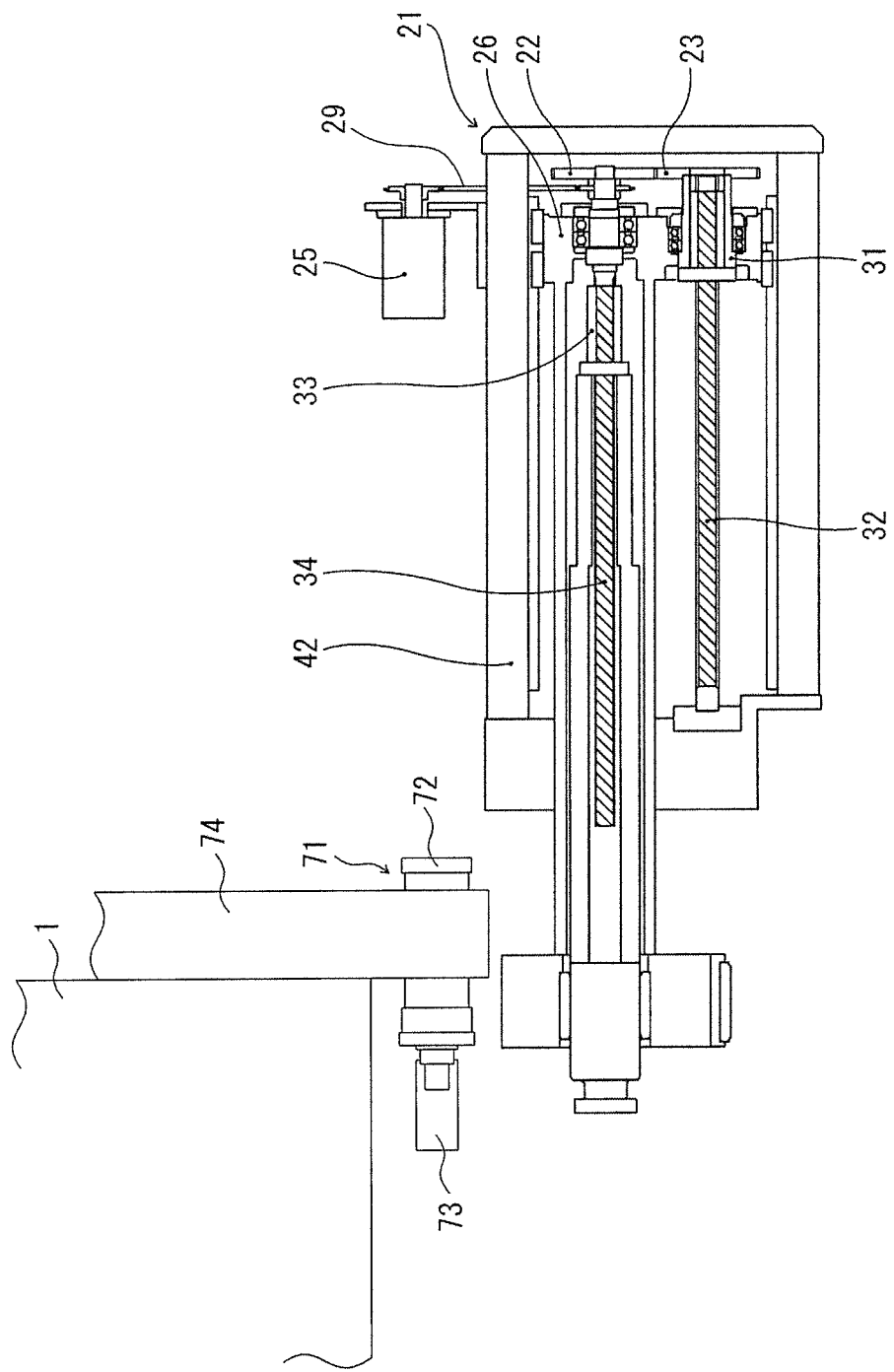
FIG. 6 is a plan view of the die-slide device and a cutting device of the extrusion press according to the first embodiment.

FIG. 6 shows the die-slide device 21 and the cutting device 71. The cutting device 71 according to the present embodiment includes a hydraulic cylinder 72, a pusher 73 fixed to a front end part of the same, and a bracket 74. As shown in FIG. 6, a hydraulic cylinder 72 is attached to the end platen 1 via a bracket 74. The cutting device 71 applies force to the die 4 together with the pusher 37 of the die-slide device 21 in order to cut the extruded product (not shown) extending continuously from the die 4 to the end platen 1 at the time of changing the die. The hydraulic cylinder 72 of the cutting device 71 operates to cut the extruded product, so it generates a greater force than the pusher 37 of the die-slide device 21, but its stroke may be a short one of about 0.8 time the die diameter. Therefore, the hydraulic cylinder 72 may be relatively small.

According to the die-slide device 21 and the cutting device 71 of the first embodiment, even if a small capacity cylinder is employed for the hydraulic cylinder 72 of the cutting device 71 and the time required for cutting by the die slide becomes slower than the past, there is a high possibility that the high-speed movement of the die-slide device 21 driven by a servo motor can make up for the delay. In this way, a hydraulic cylinder 72 having a small capacity can be used, so damage caused by the occurrence of oil leakage can be reduced. Furthermore, in this embodiment, a non-combustible oil is used as the hydraulic fluid of the hydraulic cylinder 72, so it is possible to place the hydraulic cylinder 72 close to a high-temperature die or container. That is, the risk of igniting the hydraulic oil and causing a fire is remarkably reduced.

Figure 7:
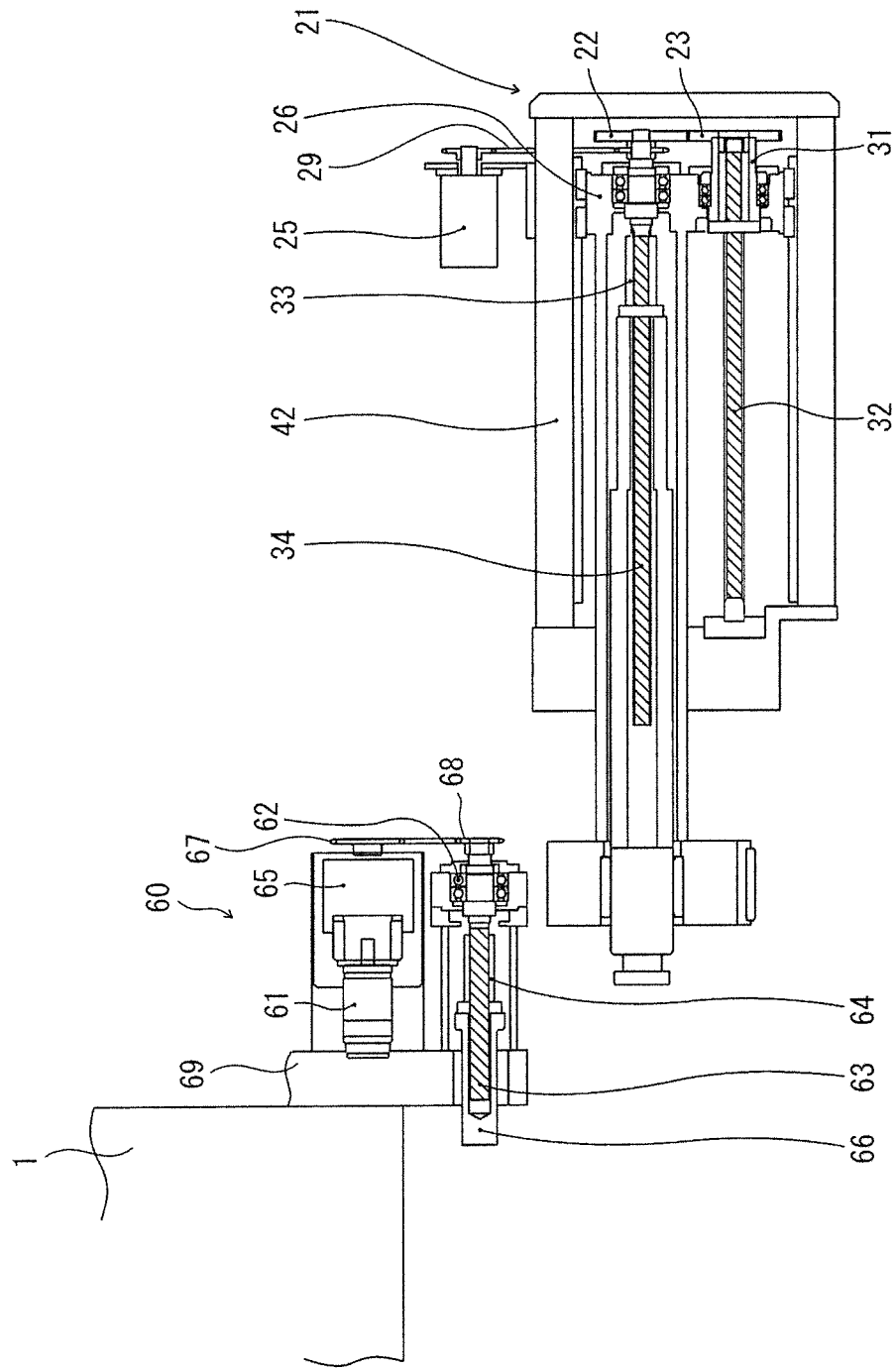
FIG. 7 is a plan view of a die-slide device and a cutting apparatus of an extrusion press according to a second embodiment of the present invention.

FIG. 7 is a plan view showing an extrusion press die-slide device 21 and a cutting device 60 according to a second embodiment of the present invention. In the second embodiment, the die-slide device 21 is the same as that in the first embodiment, but the cutting device 60 is different from the cutting device 71 in the first embodiment.

The cutting device 60 of the second embodiment is a servo motor driven type. It is configured so that when a servo motor 61 is driven, a pusher 66 moves leftward in FIG. 7. For this reason, the cutting device 60 comprises the servo motor 61, a bearing 62, a ball screw 63, a nut 64, a speed reducer 65, the pusher 66, two sprockets 67, 68, and a mounting portion 69. The cutting device 60 also comprises a chain wrapped between the sprocket 67 attached to the end of the drive shaft of the servo motor 61 and the sprocket 68 attached to the end of the ball screw 63. When the servo motor 61 is driven, the ball screw 63 constrained in linear movement rotates, and as a result, the nut 64 constrained in rotation moves to the left, so the pusher 66 fixed to the nut 64 moves leftward. The cutting device 60 is fixed to the end platen 1 by its mounting portion 69.

The stroke of the pusher 66 of the cutting device 60 may be as short as about 0.8 time the die diameter, so the ball screw 63 may be a short one.

An embodiment in which the servo motor 61 in the present embodiment is replaced with an inverter motor is also possible.

Since the embodiments of the present invention have the above-described configurations, the following effects can be obtained.

1) Since the die-slide device 21 has a structure in which two ball screws are combined in parallel, it is possible to realize a stroke equivalent to that of the conventional device by the approximately ½ shorter total length of the main body. Therefore, space saving of the equipment can be realized.

2) Since the die-slide device 21 is installed on the side opposite to the operating side outside the press machine which is not affected by the high temperature of the dies and containers, all the maintenance work can be performed outside the extrusion press machine and maintenance becomes easy.

REFERENCE SIGNS LIST 1. end platen
2. main cylinder
3. tie rod
4. die
5. container
6. billet
7. extrusion stem
8. main crosshead
9. main ram
10. side cylinder
11. side cylinder rod
12. container holder
15. die stack
16. horseshoe
17. die cassette
21. die-slide device
22. second gear
23. first gear
24. pulley
25. motor
26. moving frame
27. linear guide device
31. first nut
32. first ball screw
33. second nut
34. second ball screw
35. first bearing
36. second bearing
37. pusher
38. slide block
39. inside sliding member
40. outer sliding member
42. frame
61. motor
62. bearing
63. ball screw
64. nut
65. speed reducer
66. pusher
70. die changing device
72. hydraulic cylinder
73. cutting jig

The invention claimed is:

1. A die-slide device of an extrusion press comprising:
a fixed frame;
a moving frame supported by the fixed frame and adapted to linearly move with respect to the fixed frame but to be unable to rotate;
a first motion converting mechanism that converts input rotational motion to linear motion and outputs the same to move the moving frame linearly with respect to the fixed frame; and
a second motion converting mechanism having a pusher that pushes against a die of the extrusion press and attached to the moving frame, the second motion converting mechanism transmitting input rotational motion to the first motion converting mechanism and moving the pusher linearly with respect to the moving frame by converting the input rotational motion to linear motion and outputting the same.

2. The die-slide device of an extrusion press according to claim 1, wherein
the first motion converting mechanism comprises a first ball screw fixed to the fixed frame and extending in a direction of movement of the moving frame, a first nut screwed to the first ball screw and rotatably supported by the moving frame, and a first gear fixed to the first nut,
the second motion converting mechanism comprises a second ball screw rotatably supported by the moving frame, a second nut screwed to the second ball screw, the second nut being fixed to the pusher, and a second gear fixed to the second ball screw and meshing with the first gear of the first motion converting mechanism, and
the pusher is supported by the moving frame and adapted to linearly move with respect to the moving frame, but to be unable to rotate.

3. The die-slide device of an extrusion press according to claim 1, further comprising a motor supplying rotational drive power to the second motion converting mechanism, wherein the motor is fixed to the moving frame and moves together with the moving frame.

4. The die-slide device of an extrusion press according to claim 1, wherein the moving frame is supported by the fixed frame via a linear guide device.

5. An extrusion press comprising:
the die-slide device according to claim 1; and
a cutting device that cuts an extruded product extending through a die and an end platen of the extrusion press when changing the die of the extrusion press,
wherein the cutting device is attached to the end platen of the extrusion press, and
the cutting device comprises a pusher of the cutting device that moves in the same direction as the direction of movement of the pusher of the die-slide device to push against the die.

6. The extrusion press according to claim 5, wherein the cutting device comprises a hydraulic cylinder that drives the pusher of the cutting device.

7. The extrusion press according to claim 5, wherein the cutting device comprises a ball screw, a nut screwed to the ball screw, and a motor that supplies rotational power to the ball screw to drive the pusher of cutting device.

8. The extrusion press according to claim 5, wherein the cutting device has a stroke of cutting the extruded product of about 0.8 time a diameter of the die.

9. The extrusion press according to claim 6, wherein a non-combustible hydraulic fluid is used as hydraulic fluid of the hydraulic cylinder of the cutting device.

* * * * *